United States Patent [19]

Iverson

[11] Patent Number: 4,481,968
[45] Date of Patent: Nov. 13, 1984

[54] REGULATOR-UNLOADER FOR HIGH PRESSURE SPRAYING EQUIPMENT

[76] Inventor: Jacob E. Iverson, 451 SW. 18th Ct., Pompano Beach, Fla. 33060

[21] Appl. No.: 356,015

[22] Filed: Mar. 8, 1982

[51] Int. Cl.³ ............................................. F16K 31/38
[52] U.S. Cl. ..................................... 137/116; 239/126
[58] Field of Search ................. 137/116, 115, 505.46, 137/505.47; 239/126, 527

[56] References Cited

U.S. PATENT DOCUMENTS

| | | | |
|---|---|---|---|
| 2,710,163 | 6/1955 | Mueller et al. | 137/505.46 X |
| 2,779,290 | 1/1957 | Wiegers | 137/116 X |
| 3,524,465 | 8/1970 | Sadler | 137/115 |
| 3,774,628 | 11/1973 | Norton et al. | 137/115 |

FOREIGN PATENT DOCUMENTS 589736  6/1947  United Kingdom ................ 137/116

Primary Examiner—Martin P. Schwadron
Assistant Examiner—Stephen M. Hepperle
Attorney, Agent, or Firm—Joseph Zallen

[57] ABSTRACT

A regulator-unloader for fluid systems comprising, in a housing; an inlet passageway; an outlet passageway connected to said inlet passageway; a piston movable within said outlet passageway; an outlet valve connected to said inlet passageway and to said outlet passageway outwardly of said piston; a bypass passageway connected to said inlet passageway; a main bypass valve spaced within said bypass passageway; and a rod spaced within said inlet passageway and connected at one end to said piston and at the other end to said bypass valve; said rod being pivotally mounted in the housing at a point intermediate its ends.

9 Claims, 6 Drawing Figures

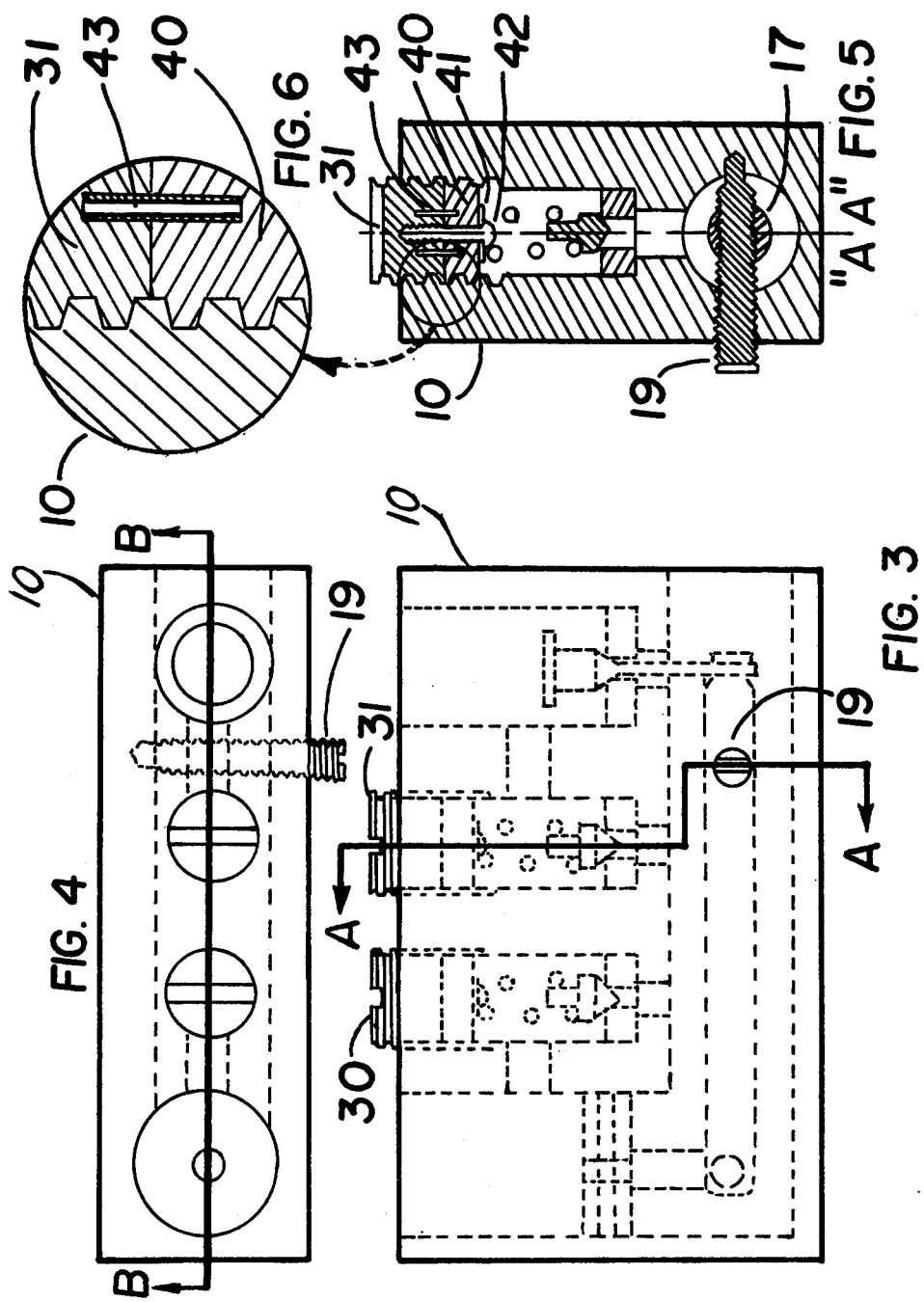

REGULATOR-UNLOADER FOR HIGH PRESSURE SPRAYING EQUIPMENT

BACKGROUND OF INVENTION

This invention relates to high pressure fluid spraying equipment. In particular it relates to high pressure liquid spray and blasting equipment where liquid is emitted from a nozzle at pressures of the order of 1,000 to 10,000 pounds per square inch, but is operable at lower or higher pressures.

High pressure water equipment is typically operated by means of a gun having a "trigger" and connected by a hose to the reservoir and pump. When the trigger is released the pressure buildup in the hose can shatter the equipment unless an "unloader" valve is actuated so that the fluid under pressure will go to a bypass. Unloaders that have been previously described are unreliable, complex and costly. In particular, unloaders of the prior art frequently become gummed up and present a serious safety hazard.

It is typical of the unloader valves of the prior art to have a spring operated valve to open the bypass port. Thus, when the trigger controlling the nozzle of high pressure fluid spraying or blasting equipment is released, as is done intermittently during blasting and spraying operations, a large back pressure builds up against the pump until it pops the spring which has been holding the bypass port in closed position. The bypass valve springs are quickly rendered inoperative by these peaks of back pressure. Further, a minimum of constant flow through the bypass of 10% of unloader rated capacity is required.

One object of the present invention is to provide a safe and reliable combination regulator and unloader.

Other objects and advantages of this invention will be apparent from the description and claims which follow, taken together with the appended claims.

SUMMARY OF INVENTION

The present invention comprises broadly an unloader for high pressure fluid spraying systems such as steam and hot water blasting, panel spraying, fire hoses, pesticide spraying, chemical spraying and batch control wherever fast stopping and starting can be achieved at the back pressure peaks of prior art equipment. The essential features are a housing, preferably a block, containing an inlet passageway and an outlet passageway connected thereto. Connected to the inlet passageway are a bypass passageway, an auxiliary bypass valve connected to the bypass passageway, and an outlet valve connected to the outlet passageway. A piston, spaced in said outlet passageway, is mounted on a pivotable rod, spaced within said inlet passageway. A bypass valve spaced in said bypass passageway is mounted on the other end of the rod. The fulcrum of the rod is near the bypass valve. The outlet valve is connected to the outlet passageway above the path of motion of the piston. The outlet valve and auxiliary bypass valve are preferably externally adjustable.

When the system is put into initial operation fluid, such as water, is continuously flowing from the inlet passageway to and through the bypass passageway. The high pressure pump is on but the trigger is not. The fluid pressure is equal on both sides of the piston e.g. 30 p.s.i. on each side, so that the piston is down and the by-pass valve up (open). When the trigger is actuated, the pressure above the piston is effectively zero; thus, the pressure below the piston raises the piston and thus lowers the by-pass valve to close the bypass passageway. The pressure buildup also opens the outlet valve, permitting flow through the outlet passageway. The outlet valve contains a spring which controls the threshhold pressure for opening the outlet valve.

If the outlet is connected to solid (iron) pipes, release of the trigger stops the flow of fluid allowing the outlet valve to shut and to equalize the pressure on both sides of the piston, permitting the piston to drop and thus raise open the main bypass valve.

Where the outlet is connected to a rubber hose or the like, release of the trigger results in a pressure build-up causing an expansion of the hose. The auxiliary bypass valve is set to open at a pre-determined safety pressure, e.g. 1100 p.s.i. When the threshhold pressure is reached the auxiliary bypass valve opens momentarily, connecting the inlet passageway to the bypass passageway. This pressure relief permits the piston to move down and raise open the main bypass valve.

Another feature of this invention is a sealing arrangement which requires no packing glands. This seal comprises a two-part threaded sealing plug, registerable with a threaded orifice. The plug comprises an outer, rigid section such as brass or steel, and an inner flexible section such as Teflon. The sections are joined by off-center roll pins and a central screw. The threading is preferably flat sided such as Acme threading.

BRIEF DESCRIPTION OF DRAWINGS

FIG. 3 is a front view of the device.

FIG. 4 is a plan view.

FIG. 5 is a view along line A—A of FIG. 3.

FIG. 6 is an enlargement of a portion of FIG. 5.

SPECIFIC EXAMPLE OF INVENTION

Figure 1:
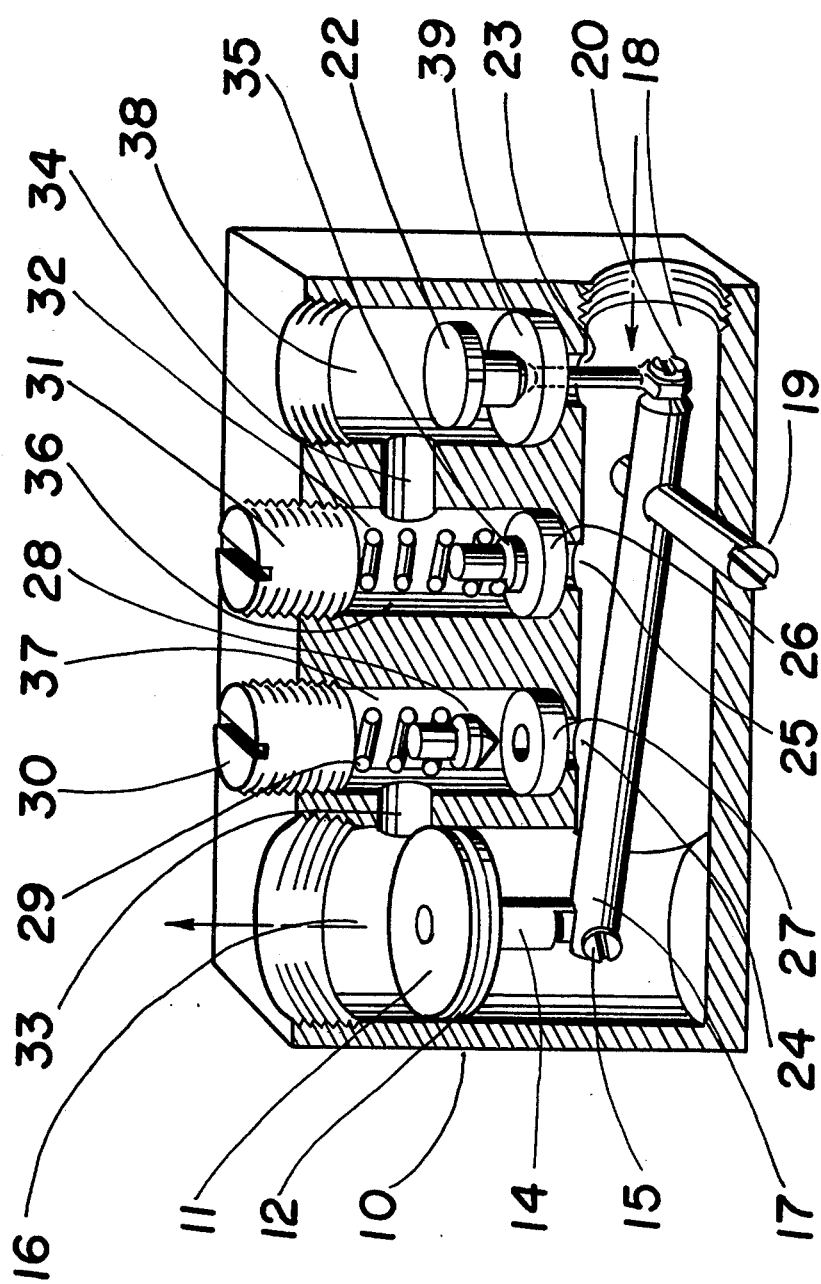
FIG. 1 is modified sectional view along line BB of FIG. 3; the body being shown in cross section with the component parts being shown complete. This Fig. illustrates an example of the invention where fluid is flowing to the nozzle and the bypass is closed.

Referring now to the drawings and in the first instance to FIG. 1, there is illustrated therein a specific example of the invention in the operating mode. A solid block 10 made from a durable, corrosion resistant material such as brass, stainless steel or rigid plastic is bored so as to form an inlet chamber 18 having threading to permit its connection to a source of high pressure fluid, an outlet chamber 16 connected to the inlet chamber and having threading to permit connection to spraying equipment, a bypass chamber 38 connected to the inlet chamber and having threading for connection to a conduit chamber 36 connecting to the inlet chamber 18 and the bypass chamber 38, and outlet valve chamber 37 connected to the inlet chamber 18 and outlet chamber 16.

Spaced within inlet chamber 18 is an elongated rod 17 which is pivotally mounted at an intermediate position on threaded screw 19 positioned in block 10. One end of rod 17 is connected by pivoting screw 15 to a rod 14 which supports piston 11 which is movable in outlet chamber 16. Piston 11 is provided with a piston ring 12. The piston is movable within the chamber 16 to an upper limit of motion just below the passageway 33 connecting the outlet chamber 16 and chamber 37. The other end of rod 17 is connected by pivotal screw 20 to bypass valve 22 which moves through passageway 23 and valve seat 39.

Chamber 37 contains outlet valve 28, which is registerable with valve seat 27 and which is normally biased downward by spring 29 adjustably pressed by adjusting screw 30. Passageway 24 below valve seat 27 connects to inlet chamber 18.

Chamber 31 has a passageway 25 to inlet chamber 18 and passageway 34 to bypass chamber 38. Spaced within chamber 36 is a valve 35 registerable with valve seat 26 and biased downwardly by spring 32, whose compression is regulated by adjusting screw 31.

Figure 2:
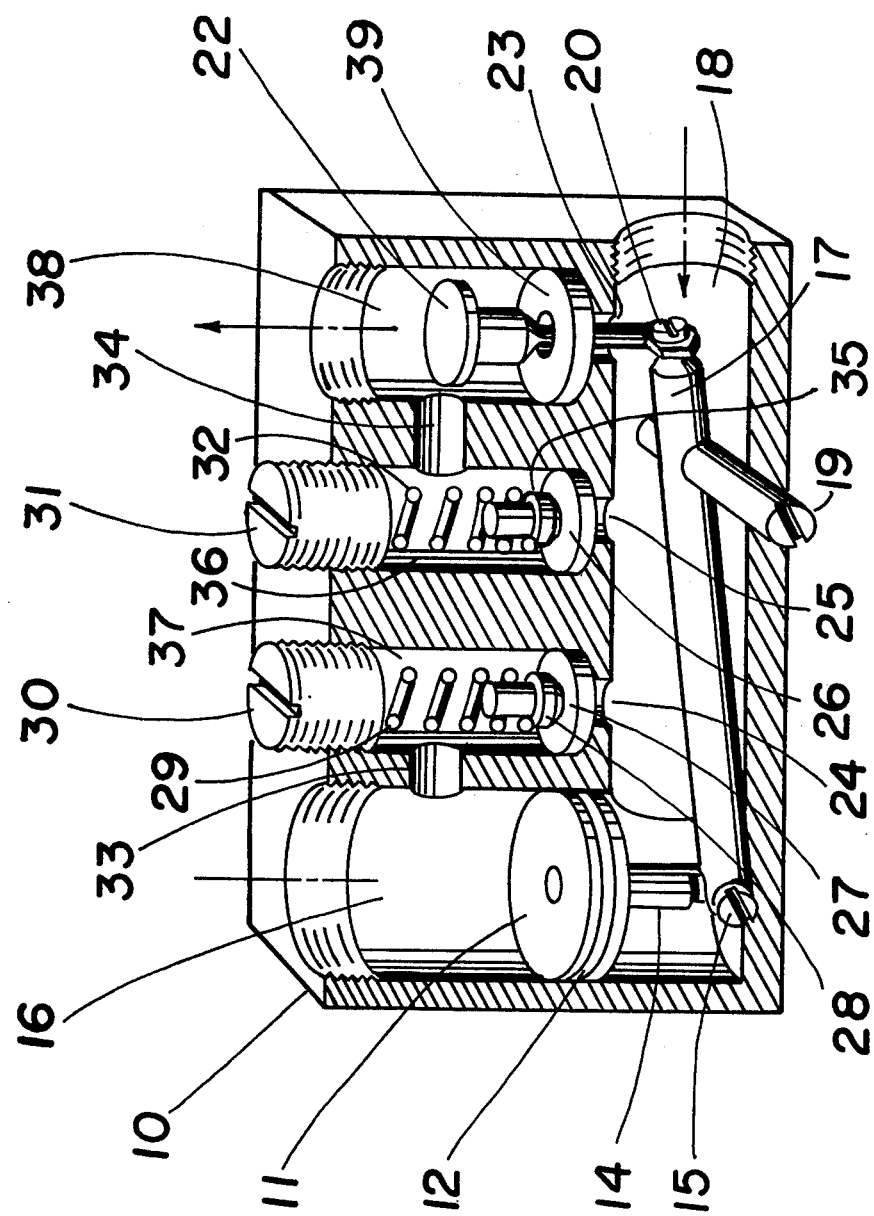
FIG. 2 is a similar view as in FIG. 1, wherein the flow has stopped and the bypass is open.

In the condition illustrated in FIG. 2 water is continuously flowing through the bypass 38, the valve 22 being up and the piston 11 being down, with both valves 28 and 35 being closed. The pressure of the inlet fluid, which can be typically 30 pounds per square inch, is equal on both sides of piston 11. When the trigger is pulled the pressure above piston 11 drops to zero so that the piston 11 is raised, shutting off the bypass valve 22. The buildup of pressure simultaneously raises outlet valve 28. This condition is illustrated in FIG. 1. Accordingly, when the trigger is pulled there is instantaneous flow of fluid and closing of the bypass.

Auxiliary bypass valve 35 in chamber 28 is provided as a safety feature particularly where flexible spraying hoses such as rubber hoses permit buildup to high pressures upon release of the trigger. Valve 35 is set to open momentarily at a very high but safe pressure, as for example, 1100 pounds per square inch. When this valve opens it permits flow from the inlet to the bypass and also sufficiently reduces the pressure below piston 11 so as to cause the piston to lower and bypass valve to rise (open). Thus, when the trigger is released, the sudden buildup of pressure throughout the system momentarily opens auxiliary bypass valve 35, thus reducing pressure in inlet chamber 18. The resultant higher pressure above piston 11 pushes it down. This action in combination with the continual fluid pressure on bypass valve 22 raises and thus opens bypass valve 22 thus permitting the fluid to go through the bypass chamber 38.

Outlet valve seat 27 typically has an orifice with a surface area much smaller than that of piston 11, as for example 1:16. Thus a spring pressure of spring 29 of two pounds per square inch is equivalent to 32 pounds per square inch under piston 11, thus keeping the bypass closed as pressure builds up. Also, since the orifice in valve seat 39 is much smaller in surface area than piston 11 and is much closer to fulcrum 19 than the piston, there is a large mechanical advantage, e.g. an inlet flow of 4 gallons a minute can create a mechanical pull of 64 pounds per square inch. As the pressure rises, the difference in pressure remains constant.

A change in flow does not affect settings. Thus, if multiple spraying guns are connected to the outlet, release of one trigger does not open the main bypass but rather causes relief by momentary opening of auxiliary bypass valve 35. Only when all the triggers are released will the main bypass valve 22 open.

Screws 30 and 31, act both as plugs for chambers 37 and 36 and as means for adjusting the tension on valve springs 29 and 32 and hence valve threshold pressures. The screws are preferably made as shown in FIGS. 5 and 6, whereby effective sealing at high pressure is provided without packing glands. The screws comprise an outer rigid component 31a (e.g. brass) and an inner flexible component 40, held together by off-center roll pins 43 and an axial screw 42. The two components 40 and 43 are firmly joined together to form a single threaded screw 31 registerable with the upper threaded orifice 41 of chamber 36. The threading is preferably flat-sided (e.g. Acme threading).

I claim:
1. A regulator-unloader for fluid systems comprising, in a housing;
   (a) an inlet passageway;
   (b) an outlet passageway connected to said inlet passageway;
   (c) a piston movable within said outlet passageway;
   (d) an outlet valve connected to said inlet passageway and to said outlet passageway outwardly of said piston;
   (e) a bypass passageway connected to said inlet passageway;
   (f) a main bypass valve spaced within said bypass passageway; and
   (g) a rod spaced within said inlet passageway and connected at one end to said piston and at the other end to said bypass valve; said rod being pivotally mounted in the housing at a point intermediate its ends.

2. The regulator-unloader of claim 1 wherein an auxiliary bypass valve is provided between the inlet passageway and the bypass passageway, which is arranged to open and connect the passageways upon buildup of a predetermined fluid pressure.

3. The regulator-unloader of claim 1 or 2 wherein threshold pressure of the outlet valve is externally adjustable.

4. The regulator-unloader of claim 2 wherein the threshold pressures of the outlet valve and the auxiliary bypass valve are externally adjustable.

5. The regulator-unloader of claim 1, 2, or 4 wherein said rod is pivotally mounted much closer to said bypass valve than to said piston.

6. The regulator-unloader of claim 1 or 2 wherein the outlet valve is spring-loaded.

7. The regulator-unloader of claim 2 wherein the auxiliary bypass valve is spring-loaded.

8. The regulator-unloader of claim 2 characterized in that when said pressure is reached, the main bypass valve is opened if there is no flow to the outlet passageway, but is closed if there is flow.

9. The regulator-unloader of claim 1 or 2 wherein threshold pressure of the outlet valve is externally adjustable and said rod is pivotally mounted much closer to said bypass valve than to said piston.

* * * * *